US010121212B1

(12) United States Patent
Barbeau et al.

(10) Patent No.: US 10,121,212 B1
(45) Date of Patent: Nov. 6, 2018

(54) SYSTEM AND METHOD FOR TRANSPORTATION DEMAND MANAGEMENT

(71) Applicants: Sean J. Barbeau, Tampa, FL (US); Edgar Banguero, Seattle, WA (US); Philip L. Winters, Tampa, FL (US); Rafael Perez, Temple Terrace, FL (US); Miguel Labrador, Tampa, FL (US); Kevin Kerrigan, Tampa, FL (US)

(72) Inventors: Sean J. Barbeau, Tampa, FL (US); Edgar Banguero, Seattle, WA (US); Philip L. Winters, Tampa, FL (US); Rafael Perez, Temple Terrace, FL (US); Miguel Labrador, Tampa, FL (US); Kevin Kerrigan, Tampa, FL (US)

(73) Assignee: University of South Florida, Tampa, FL (US)

( * ) Notice: Subject to any disclaimer, the term of this patent is extended or adjusted under 35 U.S.C. 154(b) by 406 days.

(21) Appl. No.: 15/179,541

(22) Filed: Jun. 10, 2016

Related U.S. Application Data

(63) Continuation-in-part of application No. 11/277,403, filed on Mar. 24, 2006, now abandoned.
(Continued)

(51) Int. Cl.
*G06Q 50/14* (2012.01)
*G06Q 30/02* (2012.01)
*G06F 3/0481* (2013.01)

(52) U.S. Cl.
CPC ............ *G06Q 50/14* (2013.01); *G06Q 30/02* (2013.01); *G06F 3/0481* (2013.01)

(58) Field of Classification Search
CPC ........ G06Q 50/14; G06Q 30/02; G06Q 10/47; G06F 3/0481; G06F 17/30241;
(Continued)

(56) References Cited

U.S. PATENT DOCUMENTS

| 4,804,937 A | * | 2/1989 | Barbiaux | G07C 5/008 340/425.5 |
| 4,819,174 A | * | 4/1989 | Furuno | G08G 1/0969 340/988 |

(Continued)

OTHER PUBLICATIONS

Bhat, Chandra, 2000, Incorporating Observed and Unobserved Heterogeneity in Urban Work Travel Mode Choice Modeling, Transportation Science, Informs, vol. 34, No. 2, pp. 228-238 (Year: 2000).*
(Continued)

*Primary Examiner* — Matthew S Gart
*Assistant Examiner* — Stephen S Swartz
(74) *Attorney, Agent, or Firm* — Molly L. Sauter; Smith & Hopen, P.A.

(57) ABSTRACT

Accuracy of data collected from comprehensive travel surveys is a key to studying and analyzing human travel behavior. Better understanding of travel behavior enhances the ability of transportation professionals to utilize resources available in designing appropriate solutions to existing problems. In the past, this data has been obtained through paper or phone-based surveys of individuals and households. These surveys are subject to problems, including inaccurate data due to user error, apathy, and intentional or unintentional omissions, and must often be limited to one or two days due to the amount of effort required from the participant. The present invention describes a system and method that improves both quality and quantity of data gathered on individual travel behavior across multiple modes of transportation, including non-motorized travel, and submits the data from any location. By combining Personal Digital Assistants (PDAs) and Global Positioning System (GPS) devices the proposed system automates the collection of much of the data needed to measure individual travel behavior.

20 Claims, 15 Drawing Sheets

Related U.S. Application Data

(60) Provisional application No. 60/594,288, filed on Mar. 25, 2005.

(58) Field of Classification Search
CPC .. G08G 1/00; G01C 21/3415; G01C 21/3423; G01C 21/3492; G01C 21/34; G01C 21/3617
See application file for complete search history.

(56) References Cited

U.S. PATENT DOCUMENTS

| | | | | |
|---|---|---|---|---|
| 4,954,958 | A * | 9/1990 | Savage | G01C 21/3611 379/201.06 |
| 5,208,756 | A * | 5/1993 | Song | G01S 5/0009 340/991 |
| 5,214,757 | A * | 5/1993 | Mauney | G01C 21/32 340/990 |
| 5,359,528 | A * | 10/1994 | Haendel | G07C 5/085 340/438 |
| 5,515,043 | A * | 5/1996 | Berard | B60R 25/102 340/426.19 |
| 5,543,789 | A * | 8/1996 | Behr | G01C 21/26 340/990 |
| 5,550,738 | A * | 8/1996 | Bailey | G07C 5/008 340/459 |
| 5,587,715 | A * | 12/1996 | Lewis | G01S 19/07 342/357.24 |
| 5,732,074 | A * | 3/1998 | Spaur | G07C 5/008 370/313 |
| 5,767,795 | A * | 6/1998 | Schaphorst | G08G 1/096716 340/988 |
| 5,794,164 | A * | 8/1998 | Beckert | B60R 11/02 455/3.06 |
| 5,948,040 | A * | 9/1999 | DeLorme | G01C 21/36 340/990 |
| 5,974,356 | A * | 10/1999 | Doyle | G01C 21/28 342/357.3 |
| 5,983,161 | A * | 11/1999 | Lemelson | G01S 19/11 340/436 |
| 6,028,514 | A * | 2/2000 | Lemelson | G08B 21/0211 340/539.13 |
| 6,098,048 | A * | 8/2000 | Dashefsky | G06Q 30/02 340/438 |
| 6,111,539 | A * | 8/2000 | Mannings | G01C 21/34 342/357.31 |
| 6,141,620 | A * | 10/2000 | Zyburt | G08C 17/02 340/870.07 |
| 6,154,658 | A * | 11/2000 | Caci | G08G 1/127 455/466 |
| 6,321,158 | B1 * | 11/2001 | DeLorme | G01C 21/26 340/995.16 |
| 6,434,510 | B1 * | 8/2002 | Callaghan | G01C 22/02 702/116 |
| 6,526,335 | B1 * | 2/2003 | Treyz | G01C 21/26 307/10.1 |
| 6,542,076 | B1 * | 4/2003 | Joao | B60R 25/018 340/539.14 |
| 6,552,682 | B1 | 4/2003 | Fan | |
| 6,584,401 | B2 | 6/2003 | Kirshenbaum et al. | |
| 6,622,087 | B2 * | 9/2003 | Anderson | G01C 21/3484 701/117 |
| 6,629,034 | B1 * | 9/2003 | Kozak | G01C 21/3484 340/994 |
| 6,697,730 | B2 * | 2/2004 | Dickerson | G07B 15/00 340/907 |
| 6,768,994 | B1 * | 7/2004 | Howard | G06F 17/3087 |
| 6,832,140 | B2 | 12/2004 | Fan et al. | |
| 6,862,524 | B1 | 3/2005 | Nagda et al. | |
| 7,031,836 | B2 * | 4/2006 | Branch | G01C 15/00 701/467 |
| 7,092,846 | B2 * | 8/2006 | Vock | A42B 3/0433 342/104 |
| 7,174,243 | B1 | 2/2007 | Lightner et al. | |
| 7,284,033 | B2 * | 10/2007 | Jhanji | G06Q 30/02 709/204 |
| 7,623,961 | B2 * | 11/2009 | Van Den Broeck | E21B 47/022 175/25 |
| 2004/0049424 | A1 * | 3/2004 | Murray | G06Q 10/04 705/14.14 |
| 2004/0111212 | A1 * | 6/2004 | Broeck | E21B 47/022 701/533 |
| 2004/0236504 | A1 | 11/2004 | Bickford et al. | |
| 2005/0149258 | A1 * | 7/2005 | Gargi | G06F 3/011 701/532 |
| 2006/0025894 | A1 * | 2/2006 | O'Connor | G01C 21/20 701/1 |
| 2006/0053110 | A1 * | 3/2006 | McDonald | G06Q 30/02 |
| 2006/0053146 | A1 | 3/2006 | Allhusen et al. | |
| 2006/0089787 | A1 * | 4/2006 | Burr | G01C 21/3469 701/533 |
| 2006/0122846 | A1 * | 6/2006 | Burr | G01C 21/3492 342/357.31 |
| 2006/0155439 | A1 * | 7/2006 | Slawinski | G07C 5/0858 701/33.4 |
| 2006/0173618 | A1 * | 8/2006 | Eyer | G01C 21/3484 701/469 |
| 2007/0203639 | A1 * | 8/2007 | Van Den Broeck | E21B 47/022 701/532 |
| 2008/0125959 | A1 | 5/2008 | Doherty et al. | |

OTHER PUBLICATIONS

Jean Wolf, 2000, Using GPS Data Loggers to Replace Travel Diaries in the Collection of Travel Data, Doctorate Thesis, Georgia Institute of Technology, pp. 1-216 (Year: 2000).*

Murakami et al., Using Global Positioning Systems and Personal Digital Assistants for Personal Travel Surveys in the United States, TRB Transportation Research Circular E-0008: Raising the Standard, III-B, 1-21, Aug. 2000.

Wolf et al., Elimination of the Travel Diary: An Experiment to Derive Trip Purpose from GPS Travel Data, Transportation Research Record 1768, 2001, pp. 125-134.

Griffin et al., Computerized Trip Classification of GPS Data, International Conference on Cybernetics and Information Technologies, 2006, Systems and Applications, Orlando, Florida.

Vincenty, Survey Review, Direct and Inverse Solutions of Geodesics on the Ellipsoid with Application of Nested Equations, Apr. 1975, vol. XXIII, No. 176, Kingston Road, Tolworth, Surrey.

Kumar et al., Advanced Traveler Information System for Hyderbad City, IEEE Transactions on Intelligent Transportation Systems, 2005, vol. 6, No. 1, pp. 26-37.

McCormack et al., Exploiting Object Oriented Methods for Multi-Modal Trip Planning Systems, Information and Software Technology, 1996, vol. 38, pp. 409-417.

Dillenburg et al., The Intelligent Travel Assistant, Manuscript, Mar. 15, 2002, pp. 1-7.

Linden et al., Interactive Assessment of User Preference Models: The Automated Travel Assistant, User Modeling: Proceedings of the Sixth International Conference, 1997, UM97, Vienna, New York.

Bhat. Incorporating Observed and Unobserved Heterogeneity in Urban Work Travel Mode Choice Modeling. Transportation Science. 2000. vol. 34 (No. 2): 228-238.

Wolf. Using GPS Data Loggers TO Replace Travel Diaries in the Collection of Travel Data. Georgia Institute of Technology. 2000. Thesis: 1-239.

* cited by examiner

| Trip Type | Trip | Mode | No. of Records - Continuous | No. of Records - Selective | Pct. Selective is of Continuous | Total Savings in Data Storage (bytes) |
|---|---|---|---|---|---|---|
| Walk Trips Only | 1 | walk | 104 | 20 | 19% | 4956 |
| | 2 | walk | 146 | 40 | 27% | 6254 |
| | 3 | walk | 56 | 21 | 38% | 2065 |
| | 4 | walk | 44 | 14 | 32% | 1770 |
| | 5 | walk | 75 | 30 | 40% | 2655 |
| Car Trips Only | 1 | car | 167 | 21 | 13% | 8614 |
| | 2 | car | 79 | 29 | 37% | 2950 |
| | 3 | car | 89 | 17 | 19% | 4248 |
| | 4 | car | 111 | 17 | 15% | 5546 |
| Shuttle Trips Only | 5 | bus | 72 | 20 | 28% | 3068 |
| | 6 | bus | 33 | 7 | 21% | 1534 |
| | 7 | bus | 12 | 4 | 33% | 472 |
| | 8 | bus | 80 | 13 | 16% | 3953 |
| Multimodal Trips | 1 | car | 85 | 19 | 22% | 3894 |
| | 2 | walk | 56 | 13 | 23% | 2537 |
| | 3 | walk | 29 | 8 | 28% | 1239 |
| | 4 | bus | 99 | 14 | 14% | 2655 |
| | 5 | bus | 70 | 16 | 23% | 3186 |
| | 6 | bus | 3 | 3 | 100% | 0 |
| | 7 | walk | 65 | 13 | 20% | 3068 |
| | 8 | bus | 93 | 14 | 15% | 4661 |
| | 9 | walk | 57 | 17 | 30% | 2360 |

FIG. 7

| Feedback | User | Trip | Feedback | Date Occured | Feedback | Date Occured |
|---|---|---|---|---|---|---|
| 1 | 1 | 22 | Your Trip on 12/7/2003 from Home to Work was less than 3 miles please... | 4/23/2004 | <NULL> | 12/7/2003 |
| 2 | 5 | 23 | Your Trip on 12/8/2003 from Home to Work was less than 1 mile please consider... | 4/23/2004 | <NULL> | 12/8/2003 |
| 3 | 5 | 23 | You took multiple trips on 12/8/03. Please consider chaining these trips together. | 4/23/2004 | CHAIN | 12/8/2003 |
| 4 | 5 | 24 | Your Trip on 12/8/03 from work to Liberty Middle School was less than 3 miles... | 4/23/2004 | <NULL> | 12/8/2003 |
| 5 | 5 | 25 | Your trip on 12/8/03 from Liberty Middle School to King HS was less than 1 mile... | 4/23/2004 | <NULL> | 12/8/2003 |
| 6 | 5 | 27 | Your trip on 12/8/03 from Liberty Middle School to Publix was 10 miles or more. | 4/23/2004 | <NULL> | 12/8/2003 |
| 7 | 5 | 29 | Your trip on 12/8/03 from Publix to work was less than 3 miles please consider... | 4/23/2004 | <NULL> | 12/8/2003 |
| 8 | 5 | 32 | Your trip on 12/9/03 from home to work was less than 3 miles please consider... | 4/23/2004 | <NULL> | 12/9/2003 |
| 9 | 5 | 33 | Your trip on 12/10/03 from work to Liberty Middle School was less than 3 miles... | 4/23/2004 | <NULL> | 12/10/2003 |
| 10 | 5 | 33 | You took multiple trips on 12/10/03. Please consider chaining these trips together. | 4/23/2004 | CHAIN | 12/10/2003 |
| 11 | 5 | 34 | Your trip on 12/10/03 from Liberty Middle School to King HS was 10 miles or more. | 4/23/2004 | <NULL> | 12/10/2003 |
| 12 | 1 | 38 | You took multiple trips on 12/18/03. Please consider chaining these trips together. | 4/23/2004 | CHAIN | 12/18/2003 |
| 13 | 5 | 42 | You took multiple trips on 12/19/03. Please consider chaining these trips together. | 4/23/2004 | CHAIN | 12/19/2003 |
| 14 | 6 | 50 | Your trip on 5/1/03 from home to USF was less than 1 mile please consider walking | 4/23/2004 | <NULL> | 5/1/2003 |
| 15 | 6 | 51 | Your trip on 1/7/04 from home to USF was less than 3 miles please consider... | 4/23/2004 | <NULL> | 1/7/2004 |
| 16 | 6 | 52 | Your Trip on 1/7/04 from USF to Home was less than 3 miles please consider bik... | 4/23/2004 | <NULL> | 1/7/2004 |
| 17 | 5 | 53 | Your trip on 1/8/04 from home to work was less than 3 miles please consider bik... | 4/23/2004 | <NULL> | 1/8/2004 |
| 18 | 5 | 53 | You took multiple trips on 1/8/04. Please consider chaining these trips together. | 4/23/2004 | CHAIN | 1/8/2004 |
| 19 | 1 | 70 | Your trip on 2/23/04 from home to work was less than 3 miles. Please consider bi... | 4/23/2004 | <NULL> | 2/23/2004 |
| 20 | 1 | 70 | You took multiple trips on 2/23/04. Please consider chaining these trips together | 4/23/2004 | CHAIN | 2/23/2004 |
| 21 | 1 | 77 | Your trip on 2/24/04 from home to work was less than 1 mile please consider walk... | 4/23/2004 | <NULL> | 2/24/2004 |
| 22 | 1 | 77 | You took multiple trips on 2/24/04. Please consider chaining these trips together | 4/23/2004 | CHAIN | 2/24/2004 |
| 23 | 1 | 78 | Your trip on 2/23/04 from work to Publix was less than 3 miles. Please consider... | 4/23/2004 | <NULL> | 2/24/2004 |
| 24 | 1 | 79 | Your trip on 2/24/04 from Publix to work was less than 3 miles. Please consider... | 4/23/2004 | <NULL> | 2/24/2004 |
| 25 | 1 | 87 | Your trip on 3/17/04. Please consider chaining these trips together. | 4/23/2004 | CHAIN | 3/17/2004 |
| 26 | 1 | 95 | You took multiple trips on 3/18/04. Please consider chaining these trips together. | 4/23/2004 | CHAIN | 3/18/2004 |
| 27 | 1 | 97 | Your trip on 3/18/04 from work to Credit Union was less than 3 miles. Please... | 4/23/2004 | <NULL> | 3/18/2004 |
| 28 | 1 | 98 | Your trip on 3/18/04 from Credit Union to work was less than 3 miles. Please... | 4/23/2004 | <NULL> | 3/18/2004 |

*FIG. 14*

SYSTEM AND METHOD FOR TRANSPORTATION DEMAND MANAGEMENT

CROSS REFERENCE TO RELATED APPLICATIONS

This application claims priority to currently pending U.S. Non-Provisional patent application Ser. No. 11/277,403 entitled, "System and Method for Transportation Demand Management", filed Mar. 24, 2006, which claims priority to U.S. Provisional Patent Application 60/594,288 entitled, "System and Method for Transportation Demand Management", filed Mar. 25, 2005.

GOVERNMENT SUPPORT

This invention was made with government support under contract No. BD549, RPWO #2 and USF #2117057616 awarded by the Florida Department of Transportation. The government has certain rights in the invention.

FIELD OF INVENTION

This invention relates to transportation management. More particularly, this invention relates to tracking the travel patterns of individuals.

BACKGROUND OF THE INVENTION

The transportation industry serves as an integral part of modern society's infrastructure. Every day millions of people travel on major highways across the world. As population numbers increase and nations become more industrialized and more prosperous, the use of this existing transportation infrastructure may be stretched beyond its limits. This pressure on the existing transportation infrastructure brings with it higher incidence of accidents, increased environmental pollution and traffic congestion. An alternative to building new roads is to make more efficient use of existing roads through alternate modes of transportation. Such is the approach taken by the Transportation Demand Management (TDM) industry. This alternate approach has the added advantage of alleviating problems associated with increased numbers of vehicles utilizing the roadways, such as increased costs to provide parking, increased traffic accidents and increased environmental pollution. The approach taken by the TDM additionally provides for transportation solutions for non-drivers.

In order to provide effective solutions to increased transportation demands, the TDM industry requires an in-depth understanding of the transportation patterns of the local area. In the past this has meant relying on paper-based surveys to analyze traffic flow, trip planning, and the use of public transportation. However, the paper-based surveys known in the prior art for transportation analysis have several major intrinsic flaws. First, since the amount of effort required to complete these surveys is significant (on the order of 30 minutes per day) recruiting participants to participate in the studies has been proved difficult. Second, the accuracy of the data is questionable due to user error, apathy, and intentional or unintentional omissions. Third, once the surveys are collected, they must he manually processed which in turn requires a significant amount of tine and effort for the project to be successfully completed. Additionally, it is often the case that the data collected from these individual surveys must be cross-referenced with the data collected from other individuals of the same household to be able to better understand travel mode selection behavior. This cross-referencing requires converting the manually collected data to electronic format so that more powerful and sophisticated analysis tools can be used to perform the comparative analysis.

It is known in the art to employ Global Positioning Systems (GPS) to identify the location of an individual. Typically, the GPS devices are attached to a single vehicle and are therefore not "user" based but "vehicle" based. These systems miss recording any trips that are taken by bike, walking, or transit. When collecting data, it is preferable to record an individual's complete travel behavior rather than only trips taken in a single vehicle.

Accordingly, what is needed in the art is a system and method for tracking the travel patterns of individuals that does not require the use of time-consuming paper or telephone based surveys and analyses.

SUMMARY OF INVENTION

An alternative to paper-based surveys can be found in modern technology which can eliminate many of the disadvantages described above. Personal computing devices such as Personal Digital Assistants (PDAs) have the capability to interact with a user through a Graphical User Interface (GUI) and store data locally in a database format. Coupled with a Global Positioning System (GPS), to determine an individual's location, a wireless communication device, to provide real-time data transfer, and customized software to automate the process, this combination of technological devices can readily record an individual's daily travel behavior and communicate this information back to a central location, thus eliminating many of the critical flaws found in the paper-based surveys and opening up a whole new set of opportunities and applications.

In accordance with the present invention a system and method for tracking the travel patterns of individuals is provided, the system including a Pocket PC, or its equivalent, with the capability to interact with a user through a Graphical User Interface (GUI) and store data locally in a database format, a Global Positioning System (GPS), to determine an individual's location, coupled to the Pocket PC, a wireless communication device, to provide real-time data transfer, and customized software (TRAC-IT) to automate the process. This combination of technological devices as disclosed by the present invention can readily record an individual's daily travel behavior and communicate this information back to a central location, thus eliminating many of the critical flaws found in the paper-based surveys and opening up a whole new set of opportunities and applications.

In an additional embodiment, the customized software is provided in combination with a cell phone, the cell phone thereby providing the technology for the PDS, GPS and wireless connectivity.

In a particular embodiment, the system in accordance with the present invention is portable and can therefore be carried in any mode of transportation. Additionally, the present system has the capability to remotely transfer the data from the device over the Internet to a central database. This feature removes the need to manually collect the devices and process the data, and also should allow for extended data collection periods since data analysis can begin while the test subject is continuing to collect data.

Furthermore, the customized software is written in a prospective flexible format that reduces user input and corrections to their travel data.

In an additional embodiment, the present invention further includes an artificial intelligence system in combination with the TRACIT system that analyzes the collected data and provides the user with desired feedback, much like a Transportation Demand Management expert would.

In a specific embodiment, the present invention provides a computer system adapted to collect real-time multi-modal travel behavior data from a user. The system may include a processor, a user interface coupled to the processor, a global positioning system receiver coupled to the processor and a tangible memory storage coupled to the processor. The tangible memory storage may include software instructions that cause the computer system, upon initiation of a user trip at a starting location, to prompt the user, through the user interface, to indicate an expected trip purpose for the trip, to acquire global positioning system coordinates from the global positioning system receiver for the starting location of the user, to identify a starting location description from a database of location descriptions based upon the global positioning system coordinates of the starting location of the user, and if the database of location descriptions does not include a starting location description based upon the global positioning system coordinates of the starting location of the user, prompting the user to provide the starting location description through the user interface. The tangible memory storage may further include software instructions that cause the computer system to acquire global positioning system coordinates of the user from the global positioning system receiver at predetermined intervals during a duration of the user trip, to prompt the user, through the user interface, to indicate that the user trip has ended or that the user is making a stop, and if the user indicates that the user is making a stop, prompting the user, through the user interface, to select their current location. The tangible memory storage may further include software instructions that cause the computer system to acquire global positioning system coordinates of the user from the global positioning system receiver for a stopping location of the user trip upon receiving the indication that the user is making a stop, to determine a stopping location description from the database of location descriptions based upon the global positioning system coordinates of the stopping location, and if the database of location descriptions does not include a stopping location description based upon the global positioning system coordinates of the stopping location, prompting the user to provide the stopping location description through the user interface, to display, through the user interface, the expected trip purpose and to prompt the user to adjust the expected trip purpose to indicate a trip purpose associated with the stopping location description. The tangible memory storage may further include software instructions that cause the computer system to determine a mode of transportation of the user between the starting location and the stopping location based upon the acquired global positioning system coordinates of the starting location and the global positioning system coordinates of the stopping location and to store a first trip link data, wherein the first trip link data comprises the global positioning system coordinates of the starting location, the starting location description, the global positioning system coordinates of the stopping location, the global positioning system coordinates acquired prior to the stopping location, the stopping location description, the trip purpose associated with the stopping location description and the mode of transportation used between the starting location and the stopping location, and if the user indicates that the user trip has ended, prompting the user, through the user interface, to select their current location, to acquire global positioning system coordinates of the user from the global positioning system receiver for an ending location of the user trip upon receiving the indication that the user trip has ended, to determine an ending location description from the database of location descriptions based upon the global positioning system coordinates of the ending location, and if the database of location descriptions does not include an ending location description based upon the global positioning system coordinates of the ending location, prompting the user to provide the ending location description through the user interface, to display, through the user interface, the expected trip purpose and prompting the user to adjust the expected trip purpose to indicate a trip purpose associated with the ending location description and to determine a mode of transportation of the user between the stopping location and the ending location based upon the acquired global positioning system coordinates for the stopping location and the global positioning system coordinates for the ending location. The tangible memory storage may further include software instructions that cause the computer system to store a second trip link data, wherein the second trip link data comprises the global positioning system coordinates of the stopping location, the stopping location description, the global positioning system coordinates of the ending location, the global positioning system coordinates acquired between the stopping location and the ending location, the ending location description, the trip purpose associated with the ending location description and the mode of transportation used between the stopping location and the ending location, to analyze the first link trip data including the trip purpose associated with the stopping location description and the mode of transportation used between the starting location and the stopping location, to analyze the second link trip data including the trip purpose associated with the ending location and the mode of transportation used between the stopping location and the ending location and to provide recommendations to the user for changing the user trip or the mode of transportation of the user between the starting location and the stopping location or between the stopping location and the ending location based upon the analysis of the first link trip data and the second link trip data.

In a particular embodiment, an expert system may be coupled to the processor, and the expert system may receive the stored first link trip data and second link trip data, analyze the first link trip data and second link trip data and provide recommendations to the user for changing the user trip or the mode of transportation of the user based upon the analysis of the first link trip data and the second link trip data.

In a specific embodiment, the computer system may be incorporated into a mobile, hand-held device that is responsible for collecting real-time multi-modal travel behavior data from a user and for providing recommendations to the user for changing the user trip or the mode of transportation of the user based upon the analysis of the trip data.

BRIEF DESCRIPTION OF THE DRAWINGS

For a fuller understanding of the invention, reference should be made to the following detailed description, taken in connection with the accompanying drawings, in which:

FIG. 7 is a table illustrating recorded GPS points utilizing both continuous update and selective update algorithms.

FIG. 14 illustrates an example of a table generated for use with the Expert System in accordance with the present invention.

DETAILED DESCRIPTION OF THE PREFERRED EMBODIMENT

In accordance with the present invention, an activity diary tool for transportation engineering/consulting firms could be used in a variety of planning studies. Transportation demand management programs could employ the features of the present invention to convince people to use alternatives to driving. Groups concerned with activity levels of individuals could utilize the data obtained by the present invention to encourage healthy behaviors in individuals, such as walking or riding a bike. Government funded 511/advanced traveler information services could be enhanced by the present invention by providing advice as well as information regarding possible travel options.

Transportation investments cost billions of dollars. Understanding travel behavior and patterns is critical to effective planning. The present invention provides the ability to capture all forms of travel and is not limited to only tracking vehicles. The automation aspect of the invention would allow people to be tracked for extended periods to identify variations in patterns which the more burdensome paper surveys are unable to provide.

Figure 1:
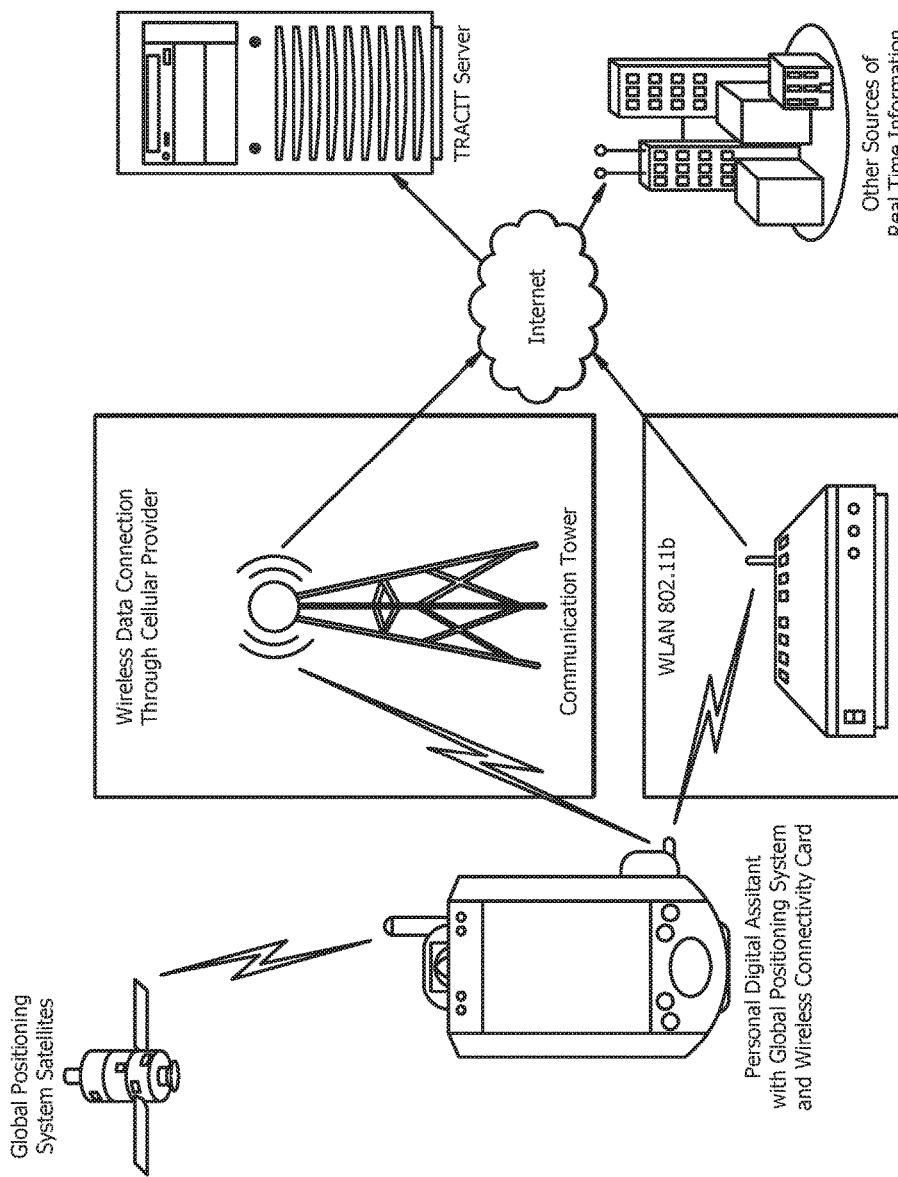
FIG. 1 is an illustrative view of the system in accordance with the present invention.

With reference to FIG. 1, the elements of the system in accordance with the present invention include a personal digital assistant (PDA) having customized software capable of collecting travel behavior data, a Global Positioning System, and wireless connectivity to a central server.

In a particular embodiment, the selection of the system components begins with the identification of the functional requirements of the system. The PDA selection is based upon six criteria: processing power, operating system (OS) and availability of Software Development Kits (SDKs), device memory, battery, expansion capabilities and cost.

The PDA, or other data collection device, selected must have sufficient computing power in order to provide the user with an appropriate interface. The PDA must be capable of reading data from a Global Positioning System (GPS) unit, be able to perform initial data processing and data storage in real-time and transfer the necessary data back to a central location. Initial estimates are that at least 200 MHz CPU will be required in order to execute real-time complex algorithms as required by the present invention. Additionally, the storage capabilities of the PDA must be able to accommodate the operating system, custom developed software application, collected data and drivers and software for the GPS device. It is estimated that Read Only Memory (ROM) of at least 32 MB will be necessary to store the operating system and an additional 64 MB of Random Access Memory (RAM) will be required for application execution and data storage. It is advantageous for the PDA, or equivalent, to have a minimum battery life of 5-8 hours to allow the collection of data for an entire day. Additionally, it is desirable that the GPS and wireless capabilities be easily integrated with the PDA and that the resulting system is reasonably compact and affordable.

The selection of the GPS component of the system is based on four criteria: system integration, expansion capabilities, a high degree of accuracy, and cost. Accordingly, it is required that the GPS system be capable of operating on battery power and not require an external power source, such as a car charger. The GPS selected should be compatible with the PDA device and capable of integrating wireless connectivity.

The wireless capabilities of the present invention may be made available through the use of a wireless card. The wireless card can be integrated into the wireless phones equipped with GPS capabilities and e911-enabled networks, can be integrated with the GPS and the PDA and is compatible with the system software, such as in the form of a CompactFlash (CF)-type hardware connection.

Figure 2:
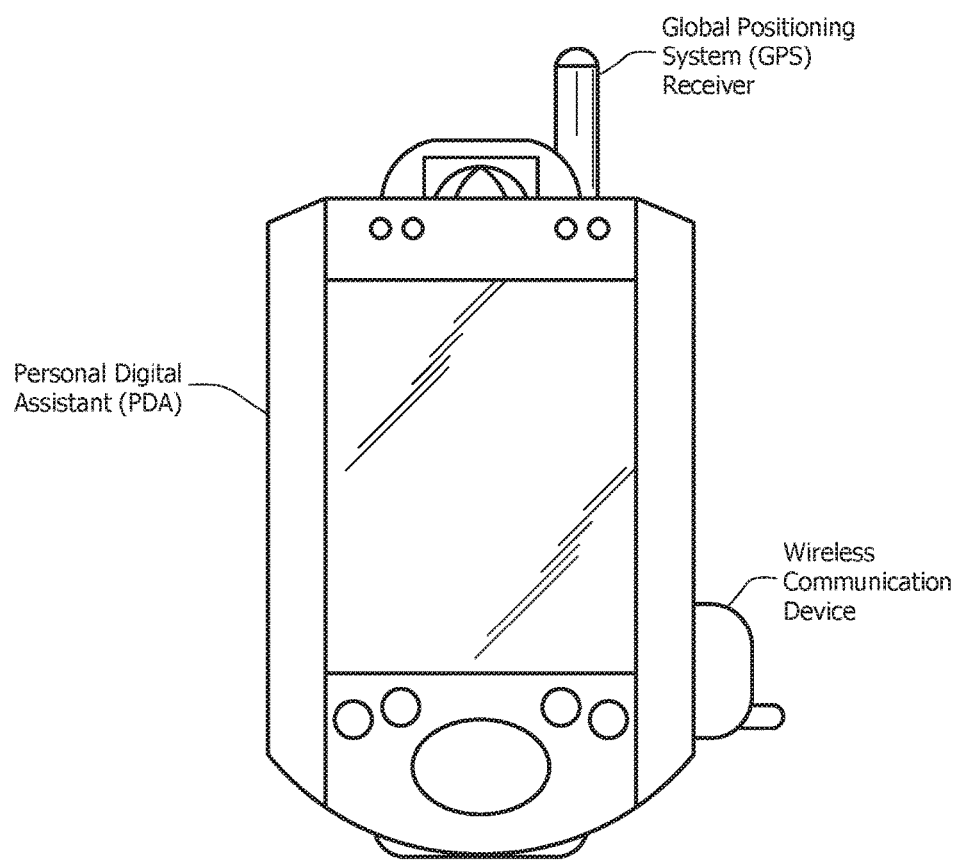
FIG. 2 is an illustrative view of the GPS unit, wireless card mount and PDA components of the system in accordance with the present invention.

Accordingly, in a particular embodiment, the system hardware of the present invention consists of three commercially available devices: a PDA, a GPS unit, and a wireless card. As shown with reference to FIG. 2, the GPS unit and the wireless card are mounted onto the PDA and all three components combine into one portable handheld device.

In an additional embodiment, wireless phones equipped with GPS capabilities and e911-enabled networks may be incorporated into the present invention.

While it is within the scope of the invention to select from a variety of PDA, GPSs and wireless solutions available on the market, in a particular embodiment, an iPAQ H5555PDA is connected to a Navman GPS 3450 through the CF port and a Sprint CF 2031 wireless connection card are used.

In an additional embodiment, a custom solution may be provided incorporating data collection, global positioning capabilities and wireless connectivity to arrive at the system envisioned by the present invention.

Several SDKs are within the scope of the present invention, including those available for the Palm® OS and Microsoft® Pocket PC operating systems. In a particular embodiment, VS.NET 2003 is used for the operating environment. VS NET 2003 will execute on any device that runs the Pocket PC 2003 operating system, which allows improved flexibility in current and future device selection. Microsoft® also provides extensive developer support and sample code for many different concepts and systems related to portable devices.

In addition to operating system software for the system, the present invention further includes customized software consisting of program modules that implement a graphical user interface (GUI) to obtain information from the individual traveler, modules that receive and analyze GPS data, a local database and database management system, and a program module to transfer the database information to a central database.

Figure 3:
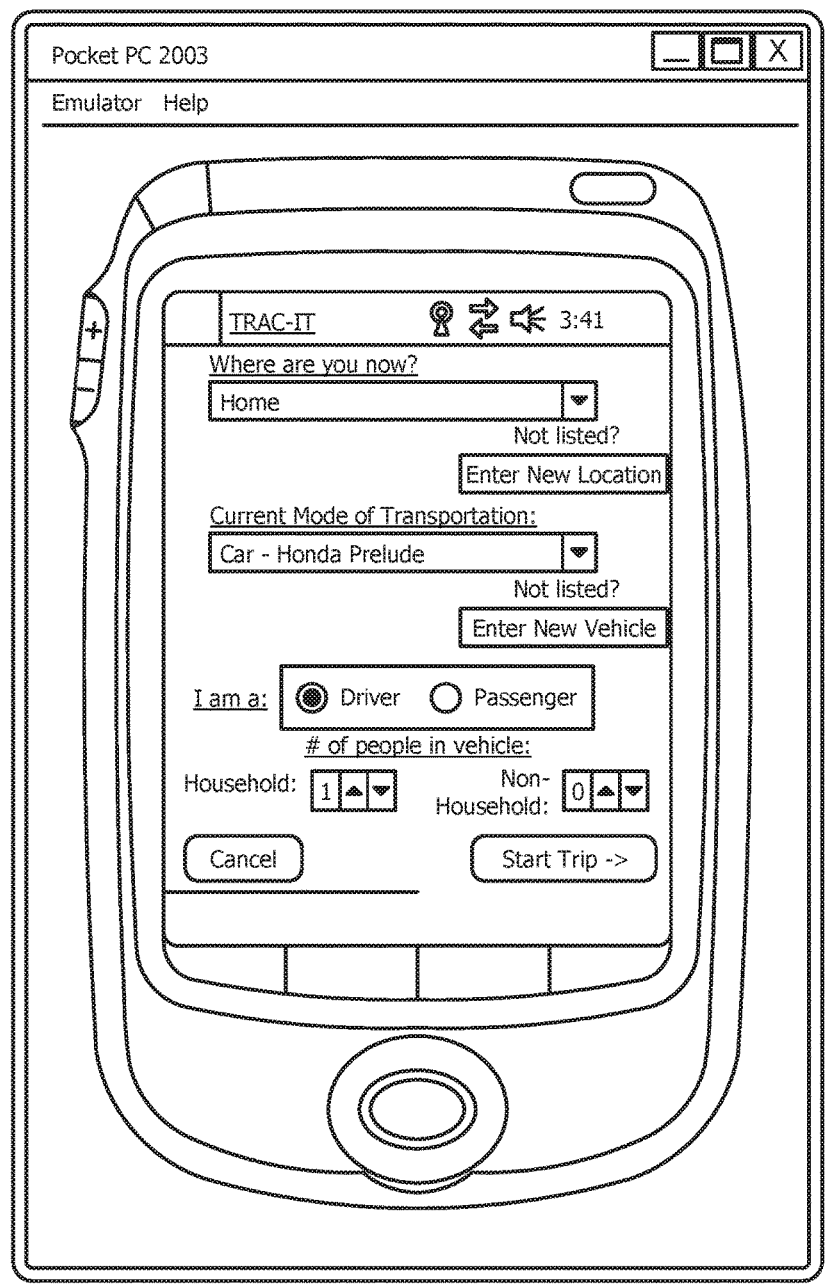
FIG. 3 is an illustrative view of the GUI interface in accordance with the present invention.

One of the many screens that comprise the GUI is shown in FIG. 3. The custom software, "TRAC-IT", is designed to guide the user through the data entry process via "wizards" or interactive screens providing step by step instructions. The effort required by the user to enter information is reduced significantly by storing data in a local database for a user's frequently visited locations, frequently used modes of transportation and frequent trips. Additionally, the time and date is automatically provided by the PDA which allows this information to be recorded for every trip taken without requiring user input.

The design of the GUI interface in accordance with a particular embodiment of the invention contains as few screens as possible to avoid extensive user input. Testing has shown that user fatigue quickly becomes an important issue and could deter the use of this system for data collection in a similar way that it affects the paper diary format. Additionally, any automation of tasks that could prevent the user from having to enter data should be included. Sample tasks include comparing a list of the user's stored locations to the user's current position and automatically filling in the field that asks the user to enter a description of their current location. A description may be requested from the user for location identification in addition to using an address or latitude and longitude so that feedback could be given to the user using their own description of the location at a later time and date. An important issue that differentiates the paper diary format from this system is the way the user is prompted to create diary entries. In the paper format, the user is asked what activity they just performed which addresses their actions in a retrospective format. In order to provide the most accurate data possible the GUI asks the user to provide information just before or while they are actually performing the activity in a prospective format. This format ensures that the correct GPS data is accurately tied to the proper activity at the proper time, which is a great advantage over the paper-based diary since it doesn't rely on the individual's memory. Research has shown that participants in travel surveys tend to round times and distances when recalling a daily trip schedule from memory. However, GPS data recorded on the same day show that arrival and departure times and traveled distances are much more evenly distributed than the subject remembered. Since the data collection process is ongoing, the prospective format also emphasizes the need for a streamlined GUI that doesn't overburden the user.

A significant challenge encountered in the design of the prospective GUI is how to assign a trip purpose and destination to a user's travel behavior. An initial GUI prototype was formatted to ask the user to provide a planned destination and a trip purpose when the user began the trip. However, this format proved to be inadequate as it was found that many users didn't follow their planned itinerary. When traveling from "Work" to "Home" with the Purpose of "Return Home", many users would actually stop at an intermediate location such as the grocery store or gas station before reaching the "Home" location. Even though a user may view this as one trip with the purpose of "Return Home", it should actually be recorded as two separate trips with the second trip having the "Return Home" purpose. This concept of trip segments with unique destinations within a larger "trip" with a separate purpose is referred to as "trip chaining", with "trip chains" usually being anchored by home or work locations. The GUI prototype format either failed to record the intermediate locations or required the user to review and correct the original purpose and planned destination. This problem has been experienced in other GPS-based surveys and is a disadvantage to using a prospective diary format. Since some research suggests that up to 30 percent of trips are complex chains which contain more than one intermediate stop, insisting that the user review and correct almost one third of their trips either in real-time or at a later date seems extreme. Therefore, the GUI in accordance with the present invention was modified to overcome the deficiencies in the prior art.

In accordance with the present invention computer system is provided to collect real-time multi-modal travel behavior data from a user. The system includes a processor, a user interface coupled to the processor, a global positioning system (GPS) receiver coupled to the processor and a tangible memory storage coupled to the processor, wherein the tangible memory storage includes software instructions for operating the computer system. The GPS may further be associated with a database which cross-references location descriptions with GPS location data. The system may also include a database of historical locations visited by a user which is also cross-referenced to GPS coordinates.

In operation of the present invention, upon initiation of a user trip at a starting location, the system prompts the user, through the user interface, to indicate an expected trip purpose for the trip. The system then acquires global positioning system coordinates from the GPS system receiver for the starting location of the user and then identifies a starting location description from a database of location descriptions based upon the global positioning system coordinates of the starting location of the user, and if the database location of descriptions does not include a starting location description based upon the global positioning system coordinates of the starting location of the user, the system then prompts the user to provide the starting location description through the user interface. During the duration of the user trip, the system acquires GPS coordinates of the user from the GPS receiver at predetermined intervals.

After the initiation of the user trip, the user interface provides the user with two possible options: "End Trip" and "Make Quick Stop". If the user selects to end the trip, the user is asked to select their current location. The user is also shown the previously selected expected trip purpose and allows the user to change the expected trip purpose, if necessary. The user trip is then saved with the source location, destination location, and trip purpose defined by the user.

Alternatively, if the user selects "Make Quick Stop", the user is also asked to identify their current location and their purpose for stopping at the location. The system then acquires GPS coordinates of the user from the GPS receiver for the stopping location of the user trip upon receiving an indication from the user that they are making a stop. The system then determines a stopping location description from the database of location descriptions based upon the GPS coordinates of the stopping location and, if the database of location descriptions does not include a stopping location description based upon the GPS coordinates of the stopping location, the system prompts the user to provide the stopping location description through the user interface. The system then displays, through the user interface, the expected trip purpose and prompts the user to adjust the expected trip purpose to indicate a trip purpose associated with the stopping location description. The system then determines a mode of transportation of the user between the starting location and the stopping location based upon the acquired GPS coordinates of the starting location and the GPS coordinates of the stopping location. The system then accesses a memory storage location and stores a first trip link data in the memory, wherein the first trip link data comprises the GPS coordinates of the starting location, the starting location description, the GPS coordinates of the stopping location, the GPS coordinates acquired prior to the stopping location, the stopping location description, the trip purpose associated with the stopping location description and the mode of transportation used between the starting location and the stopping location.

Following the stop at the stopping location, if the user then indicates that the user trip has ended, the system prompts the user to select their current location. Upon receiving the indication from the user that the user trip has ended, the system then acquires the GPS coordinates of the user from the GPS receiver for an ending location of the user trip. The system then determines an ending location description from the database of location descriptions based upon the GPS coordinates of the ending location and if the database of location descriptions does not include an ending location description based upon the GPS coordinates of the ending location, the system prompts the user to provide the ending location description through the user interface. The system then displays the expected trip purpose to the user, through the user interface, and prompts the user to adjust the expected trip purpose to indicate a trip purpose associated with the ending location description. The system then determines a mode of transportation of the user between the stopping location and the ending location based upon the acquired GPS coordinates for the stopping location and the GPS coordinates for the ending location. The system then accesses a memory storage location and stores a second trip link data in the memory, wherein the second trip link data comprises the GPS coordinates of the stopping location, the stopping location description, the GPS coordinates of the ending location, the GPS coordinates acquired between the stopping location and the ending location, the ending location description, the trip purpose associated with the ending location description and the mode of transportation used between the stopping location and the ending location.

Figure 12:
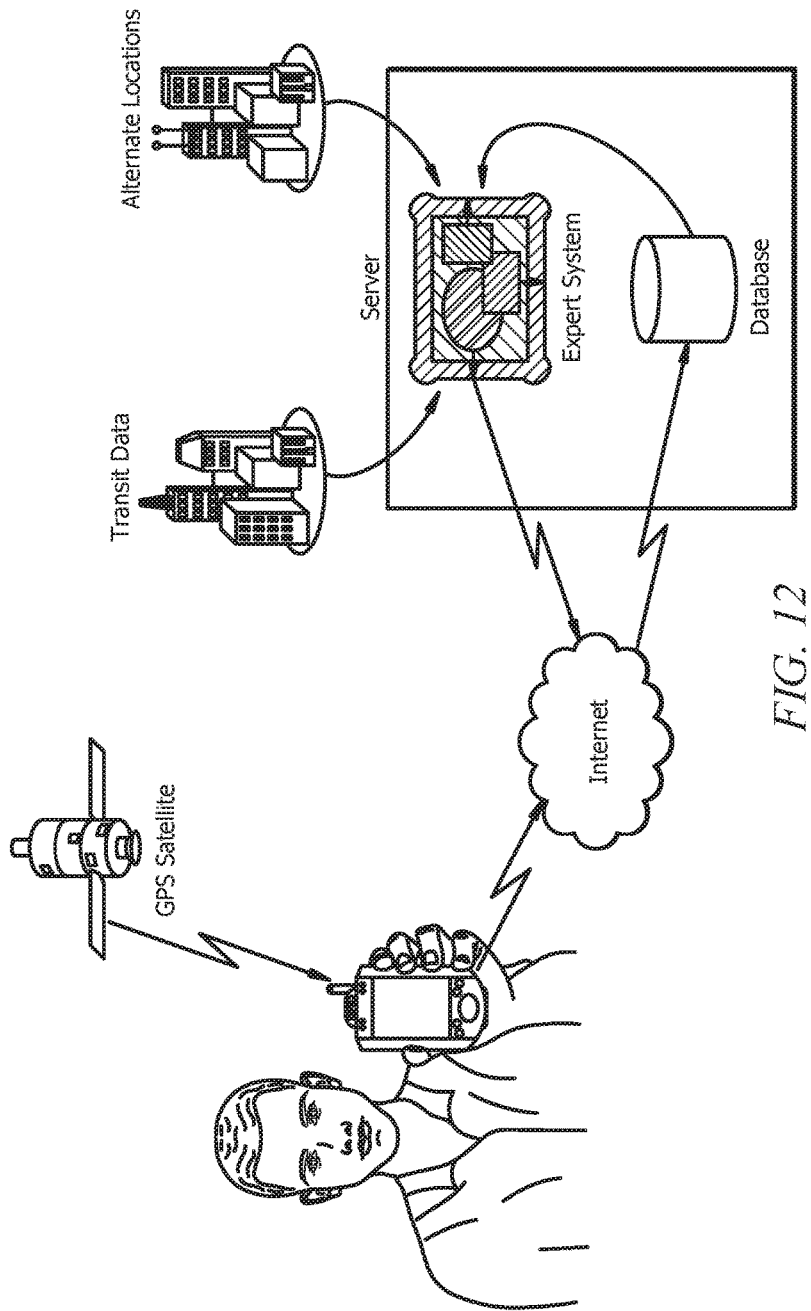
FIG. 12 is a flow diagram illustrating the expert system for travel feedback in accordance with the present invention.
Figure 13:
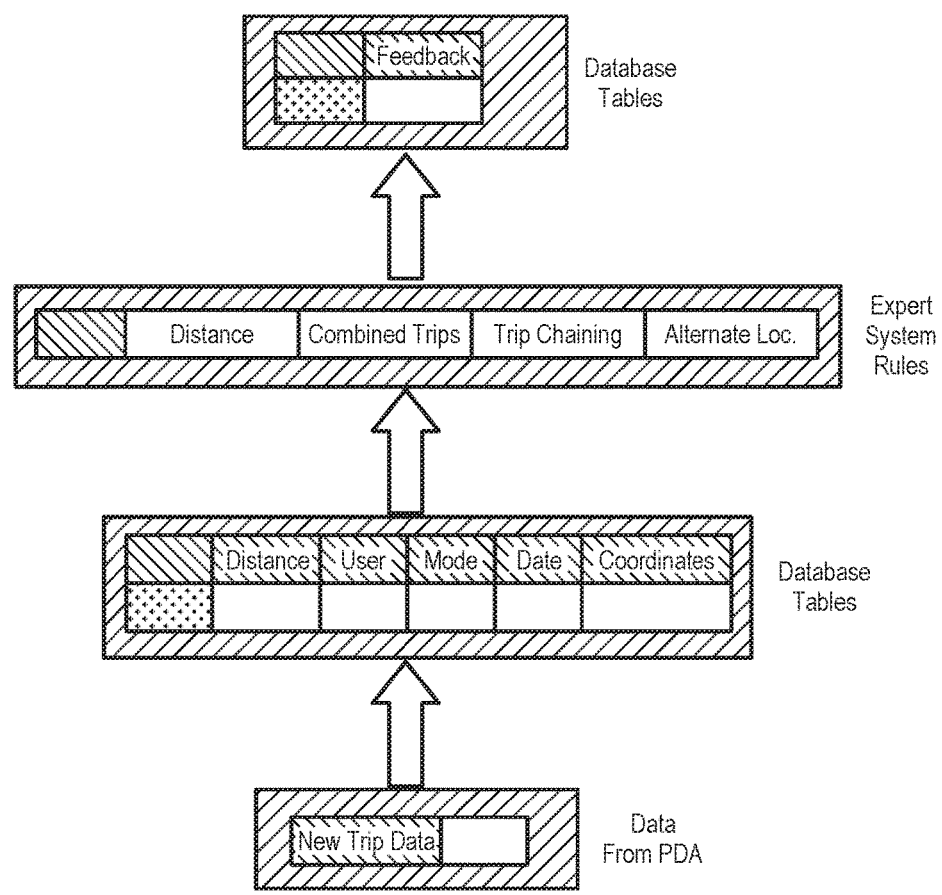
FIG. 13 is a flow chart illustrating the interaction of the PDA, the Expert System, and the SQL database in accordance with the present invention.

With reference to FIG. 12, the software instructions stored in the tangible memory storage may cause the computer system to perform functions similar to an expert system or an artificial intelligence (AI) driven system. In operation of the expert system, the computer system may provide a user with personalized feedback and travel advice based on collected data from that particular individual and their household. The artificial intelligence system in combination with the TRACIT system provides the user with desired feedback, similar to feedback that would be provided by a Transportation Demand Management expert in the field. As such, combining the TRACIT system and an expert system results in a shift from a data collection device to a tool to promote travel behavior change.

With reference to FIG. 8 through FIG. 11, an expert system for use in combination with the TRACIT system in accordance with the present invention is illustrated. In the present invention, an Expert System is an intelligent automated system that analyzes travel behavior data for individuals collected with a portable computing device such as a Personal Digital Assistant (PDA) or a cell phone with Global Positioning System (GPS) capabilities. After analysis, the expert system generates suggestions for the individual on how they might make their travel behavior more efficient, therefore saving the individual time and money. These suggestions provided to the user may also reduce traffic congestion and environmental pollution and promote the use of alternate modes of transportation over single occupancy vehicles (SOV).

In an exemplary embodiment, the expert system might suggest that, "On Oct. 4, 2004 you drove to both WalMart and Target in separate trips. Perhaps you could have combined these trips into one outing" or "On Jan. 22, 2004 you drove to WalMart, which is only about 1 mile from your home. If you are not purchasing too much to carry, perhaps you could walk rather than drive." The suggestions from the expert system may be instantly delivered to the user for consideration. It is also within the scope of the present invention to integrate the expert system with real-time information databases such as 511 and transit schedules. This could provide instant feedback to the user based on real-time occurrences, such as traffic incidents. Information on alternate locations could also be delivered to the user in case there is a closer location for the goal of the trip, i.e. to find a specific restaurant or type of restaurant.

In accordance with one embodiment of the expert system of the present invention, the expert system creates triggers on tables when the tables receive new trip information. These triggers then initiate stored procedures that apply predetermined rules based on the analysis of the trip. The data that is returned from the analysis is then stored in a separate results table that includes the PDA and USERID to track which user the data should be returned to. The expert system is designed to deliver personalized feedback to the user based on the trips recorded for that particular user. The solution to this problem involves PL/SQL stored procedures that will run for each trip, and populates a corresponding table to store all suggestions for that particular trip.

Figure 10:
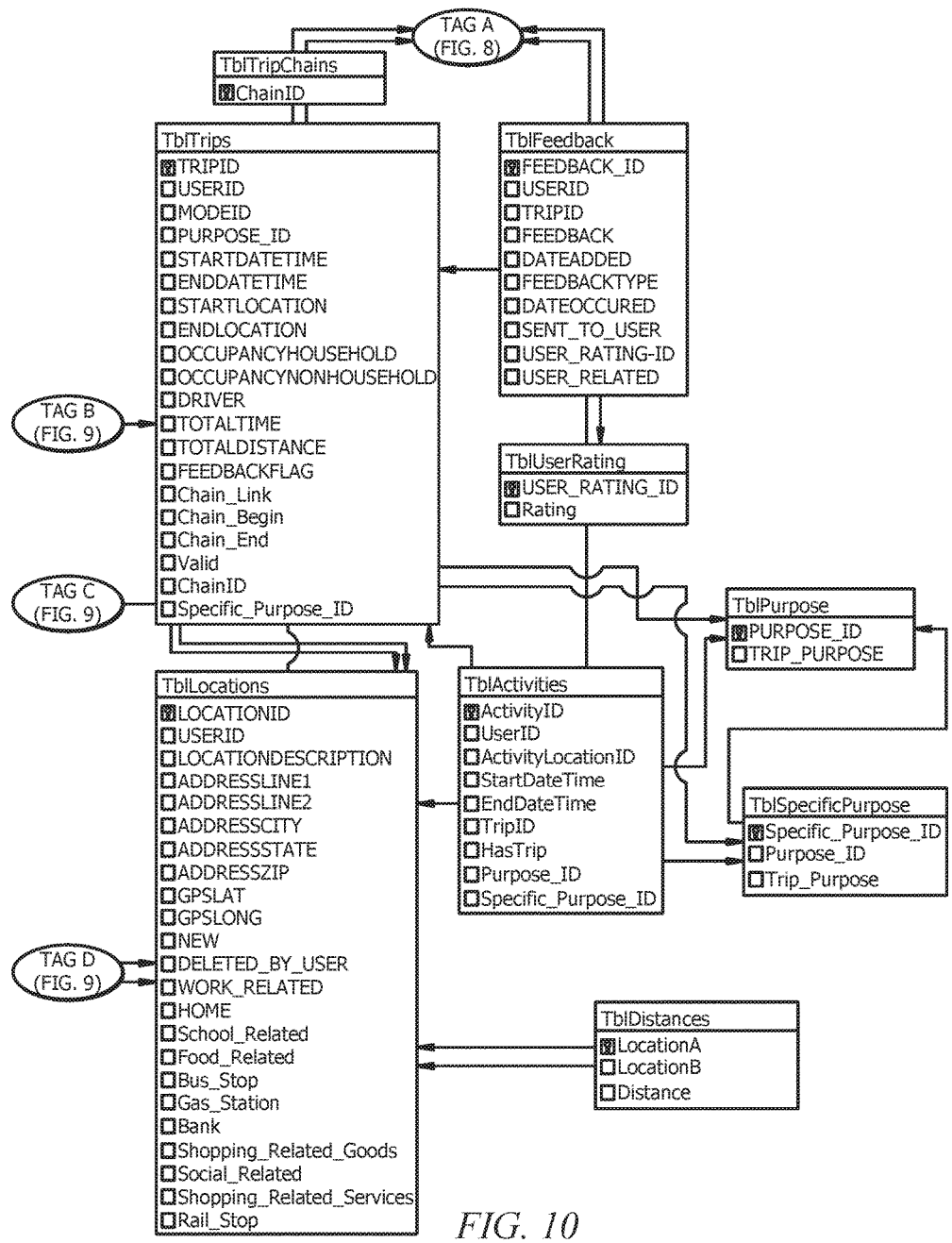
Figure 11:
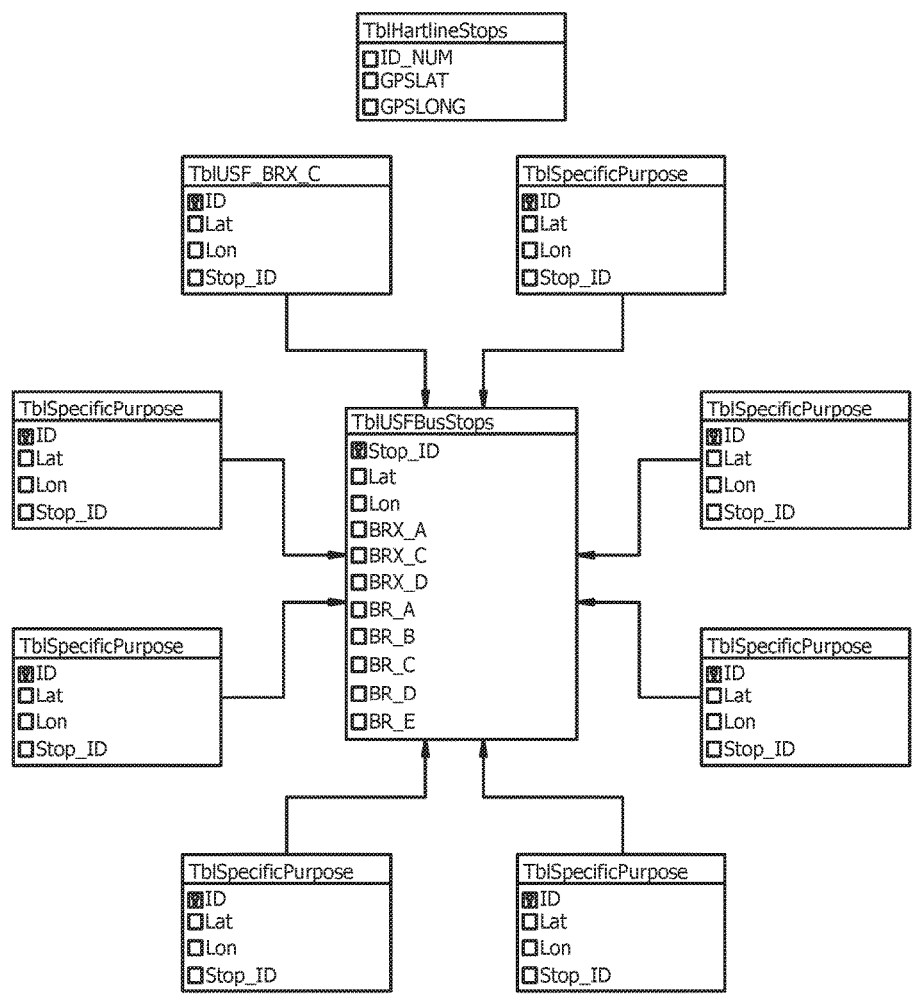

The flow chart shown in FIG. 10 depicts the interaction of the PDA, the Expert System, and the SQL database. The process starts with the collection of the data, which is stored locally on the PDA's SQL CE database. Upon synchronization to the server, the data from the PDA is transferred to the database tables housed on the server, as shown by the first arrow. Once these tables are populated, a flag in the tblTrips is defaulted to a 1. This tells the Expert System that it has not yet analyzed this trip. Once synchronization is complete, the Expert System is triggered to analyze all trips in tblTrips that has a flag of 1 set. Once this happens the trip is checked against certain criteria, and then sent to sub-procedures which will calculate a particular feedback. There is one stored procedure for each type of related feedback. For example, the stored procedure that calculates distance takes into account, rules for walking, biking, and internet shopping. After the expert system has analyzed all new trips, it will store all suggestions that meet the internal rules into a newly created table entitled tblFeedback. A sample of tblFeedback is shown with reference to FIG. 10.

Figure 15:
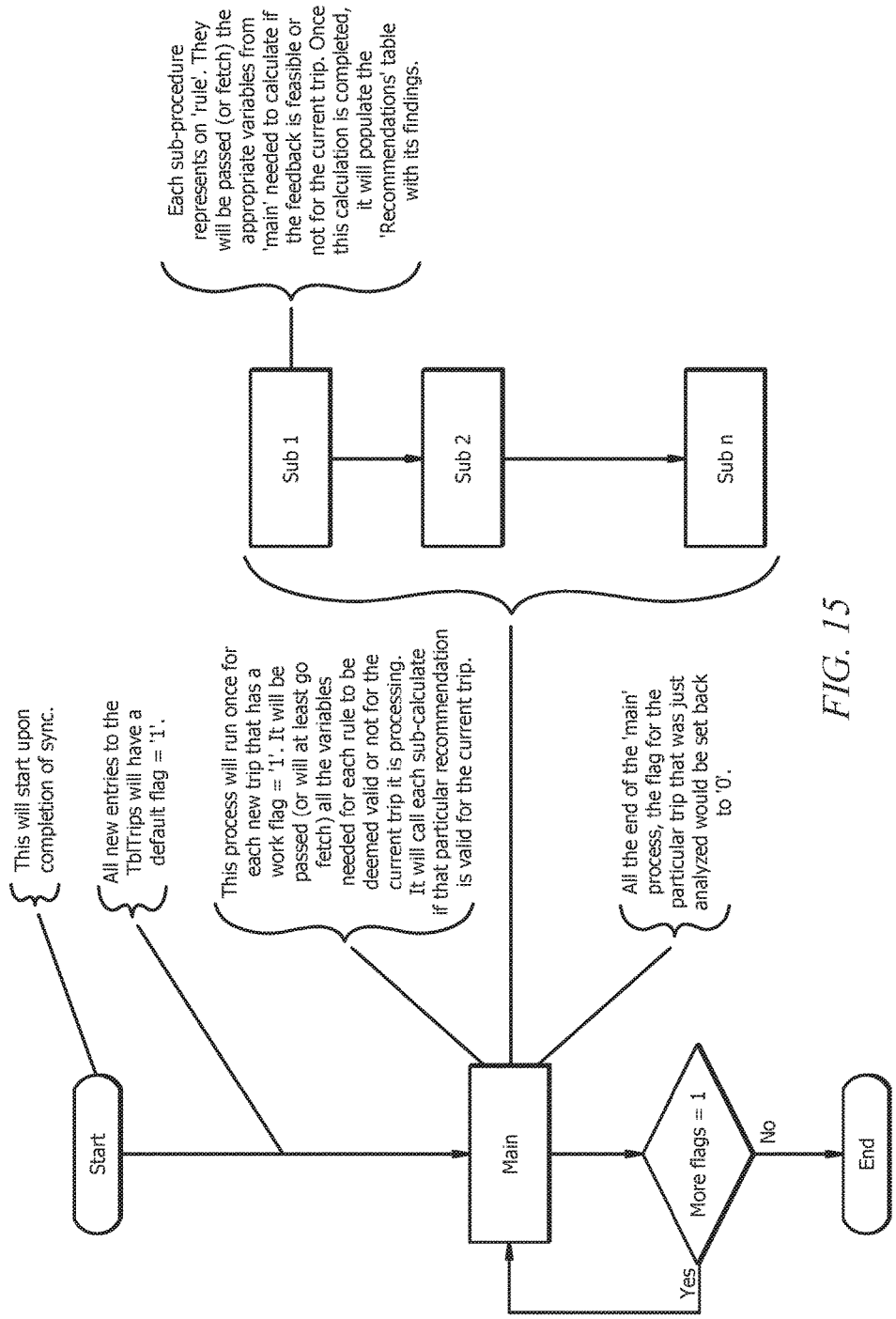
FIG. 15 illustrates an overall layout of an exemplary embodiment of how the Expert System executes sub-procedures in accordance with the present invention.

An overall layout of an exemplary embodiment of how the Expert System executes sub-procedures is shown with reference to FIG. 15. The main procedure decides which sub-procedures (individual rules) to execute based on basic criteria. Once the correct rules are ran for a particular trip, the flag is set to 0 to indicate to the Expert System that it has already processed this trip.

In one embodiment of the present invention for providing suggestions to a user to make modifications to their trip behavior, following the collection and storage of the first trip link data and the second trip link data for the user trip, the computer system and associated expert system may be used to analyze the collected data and to make recommendations to the user. In a particular embodiment, the system analyzes the first link trip data including the trip purpose associated with the stopping location description and the mode of transportation used between the starting location and the stopping location. The system further analyzes the second link trip data including the trip purpose associated with the ending location and the mode of transportation used between the stopping location and the ending location. Based upon the analysis of the first link trip data and the second link trip data, the system may provide recommendations to the user for changing the user trip or the mode of transportation of the user between the starting location and the stopping location or between the stopping location and the ending location.

In the present invention, the trip between the starting location and the stopping location is identified as a link in a trip chain. Following the stop at the stopping location, the user then may choose to resume their initial trip chain of the trip, which is identified by the initial expected purpose of the trip prior to the stop at the stopping location. While transparent to the user, this function actually creates a second trip with the beginning of the second trip being the stopping location and with the destination location and purpose being defined once the user chooses to end the trip, or make another quick stop. As such, in the present invention, multiple trip links can be recorded sequentially. All subsequent trips up to and including the trip during which the user chooses "End Trip", are identified as links in the trip chain. This format allows the user to automatically redefine trip parameters in real-time without burdening them with the task of low-level information manipulation. Additionally, when crossing between two modes of transportation during a trip, a user can quickly identify their new mode of transportation without having to go through the process of ending one trip and beginning another.

Accordingly, in the present invention the system may make recommendations to a user for changing the user trip or the mode of transportation of the user for any of the various links in the user trip.

In an exemplary embodiment illustrating the use of the expert system for providing recommendations to a user for changing their user trip or their mode of transportation, if a user initiates a trip to the local grocery store from their home and a return trip back to their home using their car, the system of the present invention may acquire and store the first link trip data including the GPS coordinates of their home as the starting location, the GPS coordinates of the local grocery store as the stopping location, the GPS coordinates between their home and the local grocery store and the description of the local grocery store as a store, with the trip purpose being to go to the store and the mode of transportation being a car. Upon the return trip from the store to home, the system may acquire and store second link trip data including the GPS coordinates of the store as the stopping location, the GPS coordinates of their home as the ending location and the GPS coordinates between the store and their home, with the trip purpose being to return home and the mode of transportation being a car. The first link trip data and the second link trip data may be synchronized with and stored in a table accessible to the expert system. After the first link trip data and second link trip data is stored in a table associated with the expert system, a trigger initiated by the new table entry may be used to trigger the expert system, indicating that new trip data is available to be analyzed. The trigger may initiate stored procedures to apply rules based upon the analysis of the user trip. For example, the expert system may initiate a procedure to determine the distance between the starting point, stopping point and ending point of the user trip. Knowing the mode of transportation, the expert system may then apply a predetermined rule associated with the mode of transportation being a car and the distance traveled during one or more links of the user trip. For example, the rule might be that if the distance of any link traveled by car is less than 1 mile, a suggestion should be made to the user to walk instead of driving a car. The suggestion may then be stored in another table and provided to the user as a suggestion to modify their mode of transportation for the recorded trip, whereby the suggestion is made to the user to walk to the store instead of using the car. As such, based upon the analysis of the first link trip data, between home and the store, and the second link trip data, between the store and home, if the distance between the user's home and the store is less than 1 mile, the expert system may provide a recommendation to the user to change their mode of transportation from driving a car to walking between home and the store.

Figure 4:
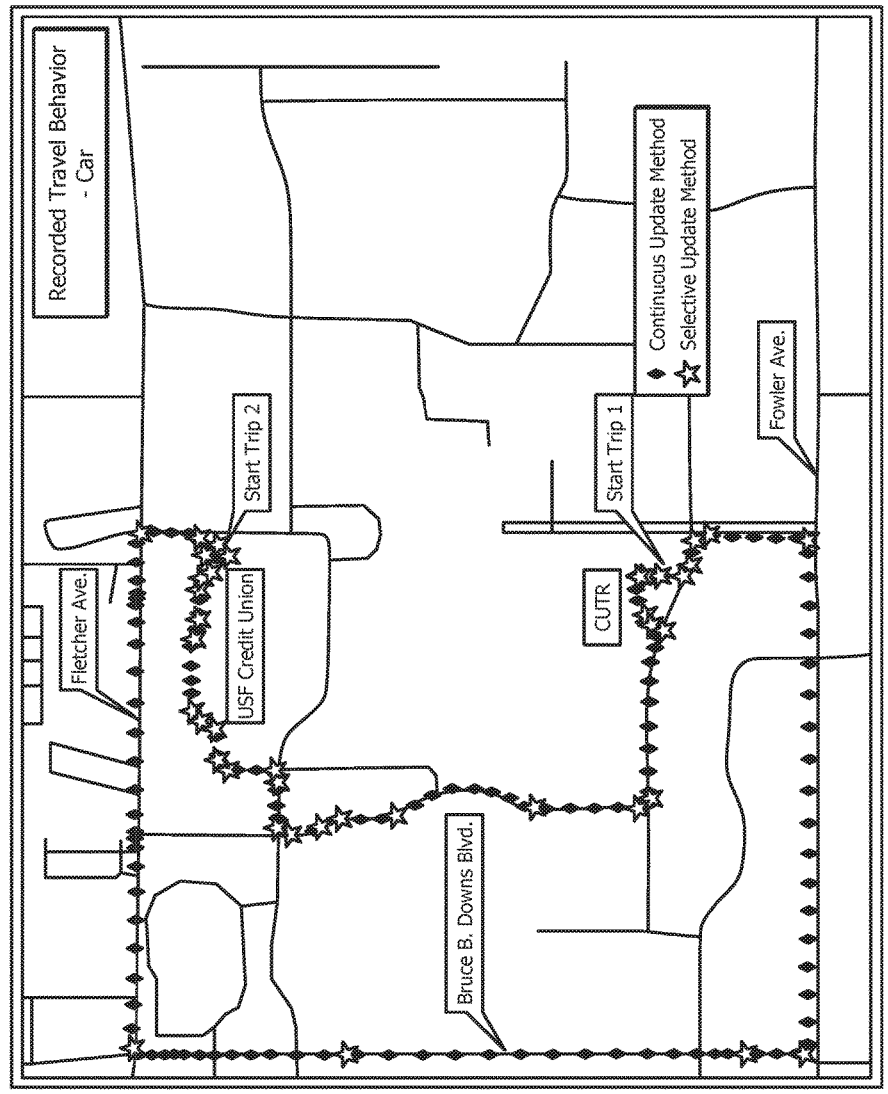
FIG. 4 is a diagram illustrating the GPS points recorded utilizing continuous update and selective update algorithms in accordance with the present invention.

In determining the mode of transportation of the user, the GPS data processing component of the system allows the user's position, speed, and heading to be automatically recorded. This feature provides not only the starting and ending points of a user's trip but also records the exact route taken to the destination and therefore the precise distance traveled. GPS devices use signals from multiple satellites in orbit above the earth to triangulate the user's position and calculate other information, such as speed and heading. This technology must have a direct line-of-sight path to at least four satellites in order to fix the user's location in three dimensions and to at least three satellites to identify the user's location in two dimensions. The information from these signals is then processed by the GPS data processing component and delivered to the PDA through a virtual serial connection on the CompactFlash port. The GPS information may consist of a string formatted in the National Marine Electronic Association's (NMEA) 0183 Version 2.20 standard and is updated once every two seconds. This string is then parsed to yield location information including latitude, longitude, speed, and heading. The software module that analyzes the GPS data contains an algorithm that determines the critical GPS coordinates that must be recorded to be able to accurately reconstruct each trip taken. Instead of recording GPS coordinates on a continuous basis and sending these to the central database, the software examines every new GPS reading and decides whether it is needed in order to reconstruct a trip. Examples of GPS data that is not needed to reconstruct a trip include GPS data when there is no significant travel movement or when the travel is in a straight line. Since the system is designed to operate over a longer period of time than a standard activity diary, a significant amount of data will be produced. The software was tested by comparing identical trips recorded using all available GPS coordinates (Continuous Update method) and GPS coordinates selected by this algorithm (Selective Update method). The results for two different trips are shown in FIG. 4. It can be seen in this figure that the Selective Update method was just as accurate as the Continuous Update method, but with fewer GPS coordinates recorded. Trip 1 in FIG. 4 represents a car trip in an urban setting that lasts approximately 10 minutes at an average speed of 25 mph and consists mainly of straight travel segments. The data generated by the Selective Update method was only 13% of the amount of data generated by the Continuous Update method. Trip 2 in FIG. 4 shows a car trip with fewer straight travel segments that lasts approximately five minutes at an average speed of approximately 25 mph. In this situation, the data generated by the Selective Update method was approximately 37% of the amount of data generated by the Continuous Update method.

Figure 5:
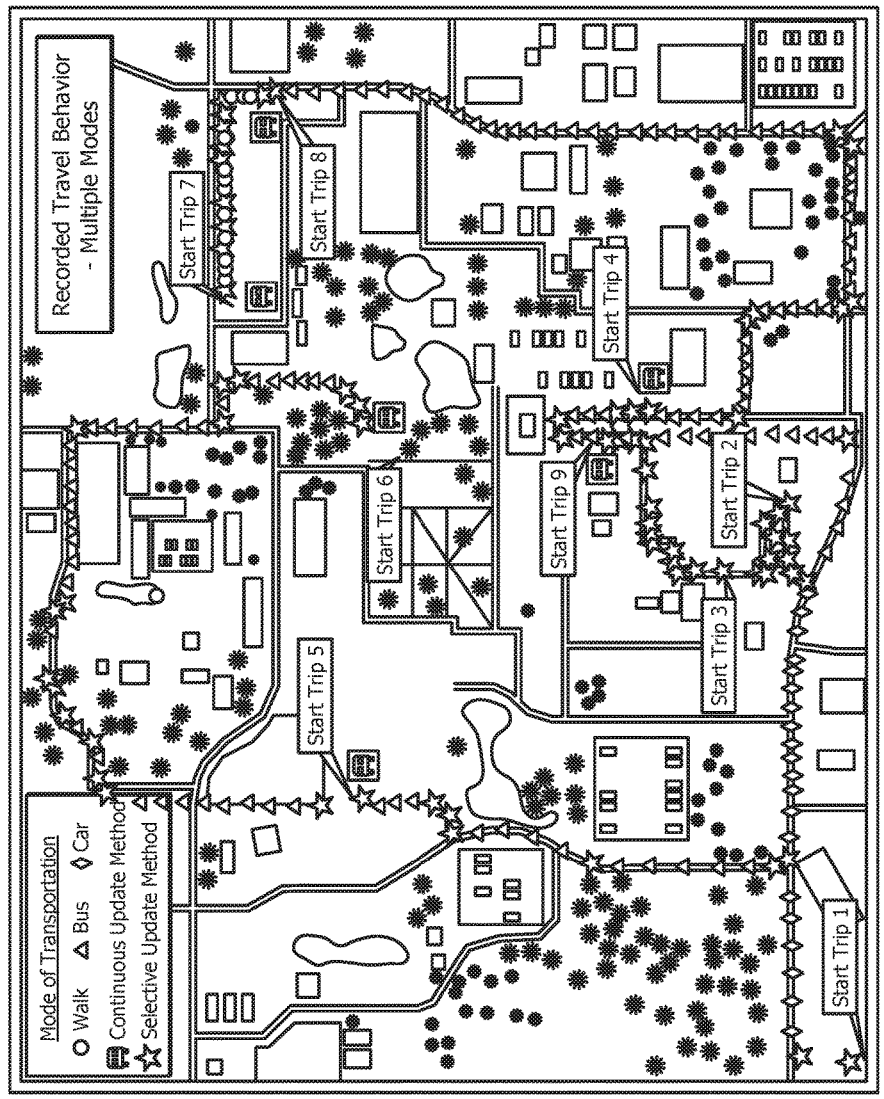
FIG. 5 is a diagram illustrating the GPS points recorded utilizing continuous update and selective update algorithms for multimodal trips in accordance with the present invention.

FIG. 5 represents a multimodal trip using walk, shuttle bus, and driving a private vehicle. Again, the Selective Update method was nearly as accurate as the Continuous Update method, even with several mode changes for the same trip. The recorded distance using the Continuous Update method is more precise than the Selective Method. Modifications can be made to track the distance using the Continuous Update method but deleting the noncritical points after calculating the total distance between critical points.

Figure 6:
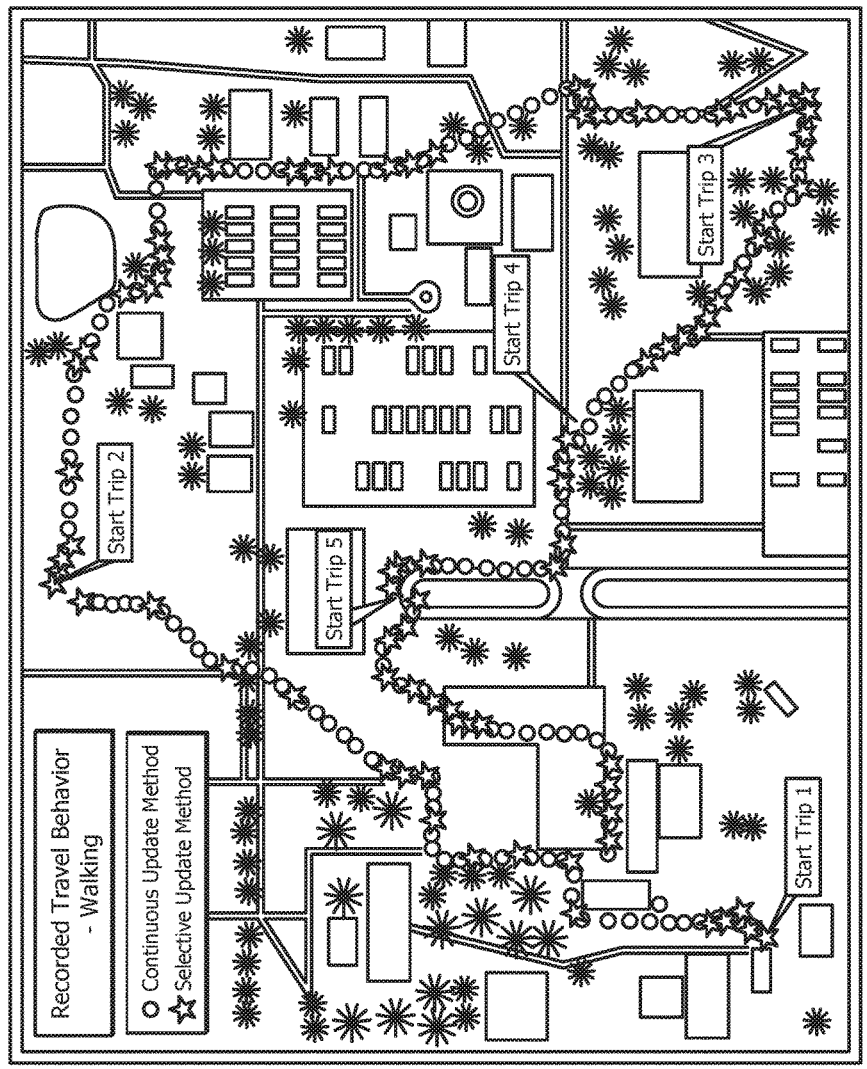
FIG. 6 is a diagram illustrating the GPS points recorded utilizing continuous update and selective update algorithms when walking in accordance with the present invention.
Figure 8:
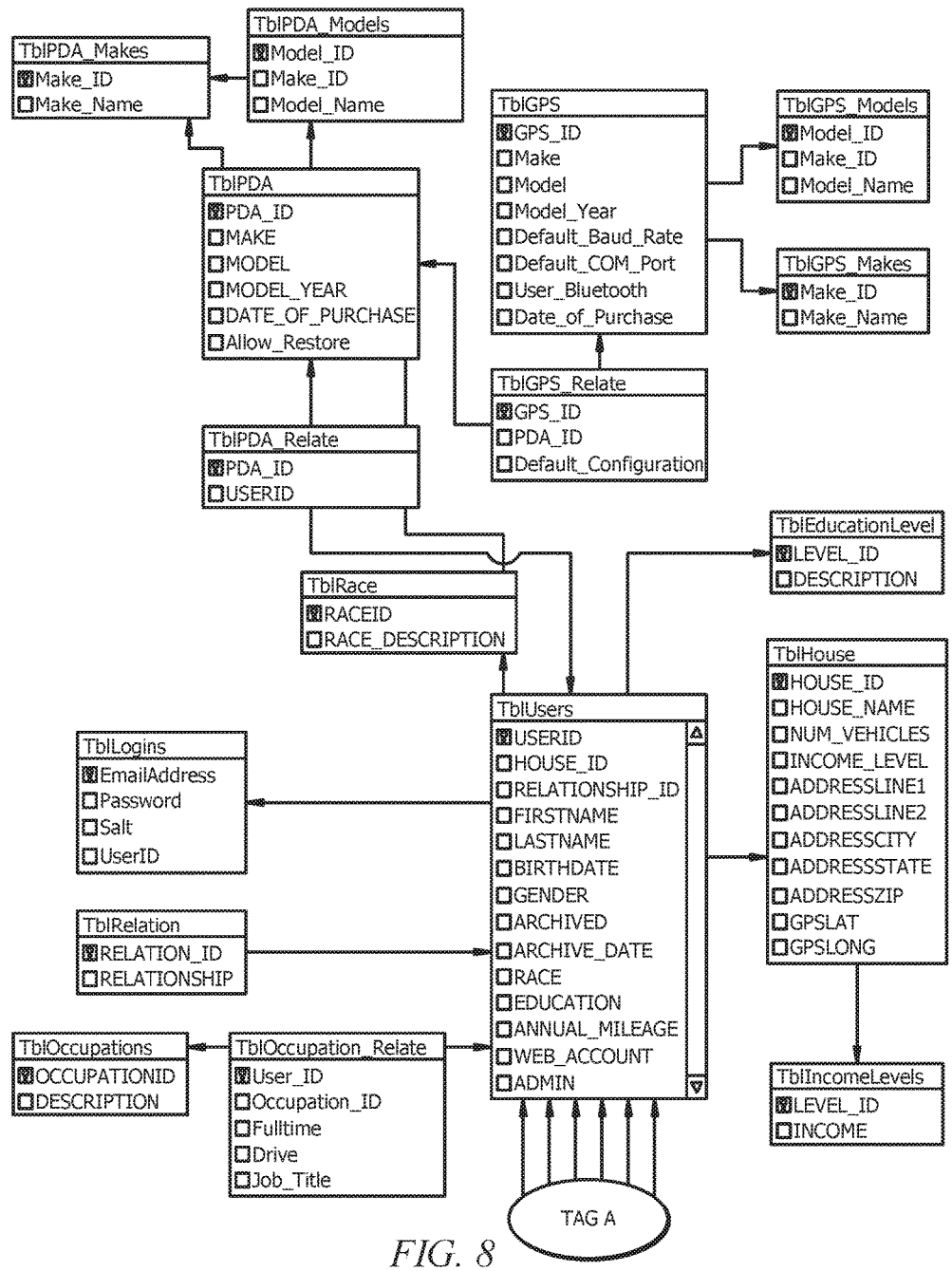
FIG. 8-11, in combination, are illustrative of a design of a relational database to consolidate the collected data.
Figure 9:
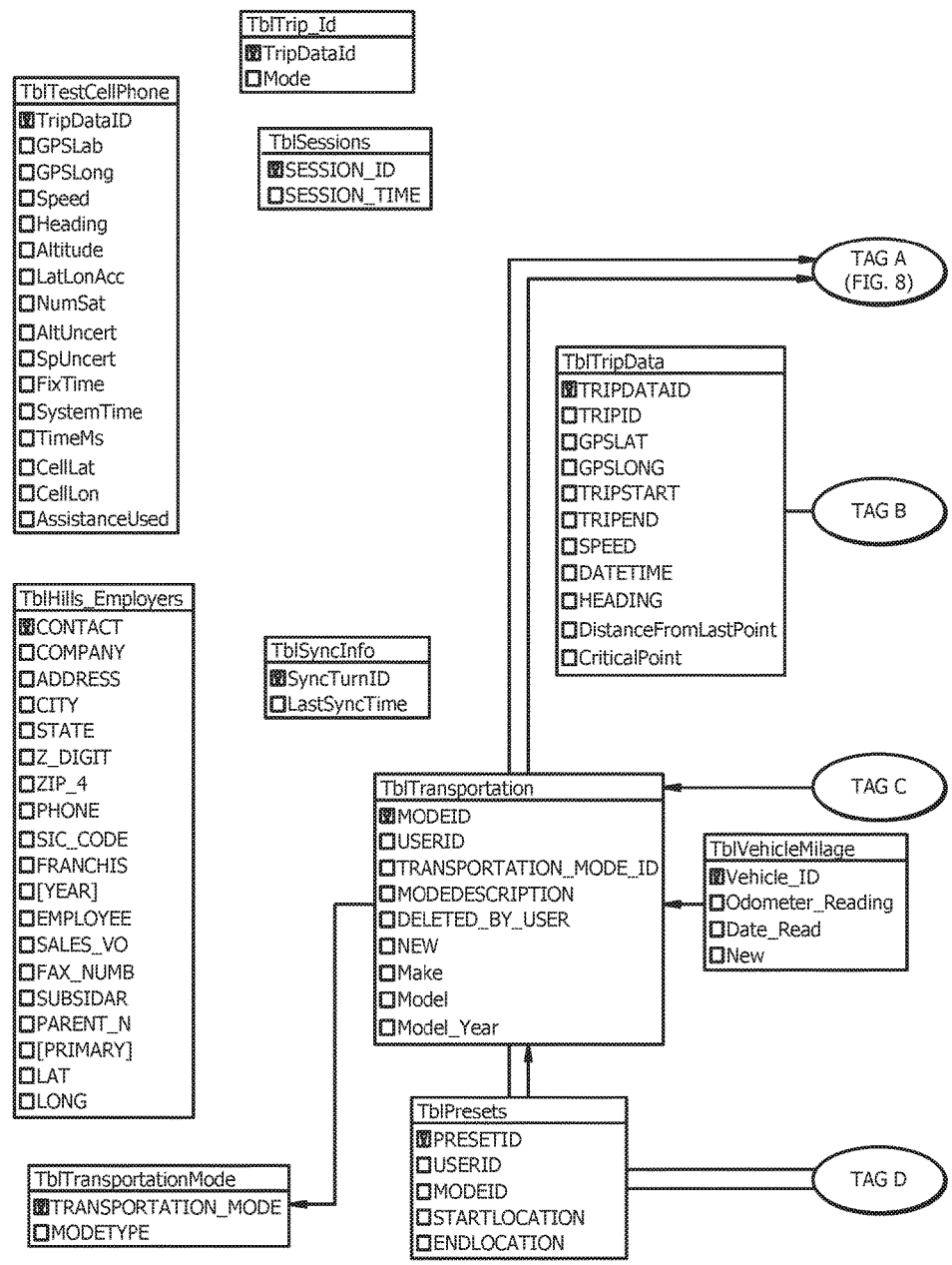

FIG. 6 represents five different walking trips around the USF campus. On average, the Selective Update method recorded about 29% of the points.

Table 2 summarizes the savings for all the trips represented in FIGS. 4, 5 and 6. Overall, there was a 72% reduction in the data storage and data transfer bandwidth requirements, without significant loss of travel patterns. The reduction in the amount of data collected is beneficial in several ways. First, the overall size of both the local (PDA) database and server database is significantly reduced, which allows faster querying and record retrieval and requires a fraction of the total storage space. Secondly, the communication time between the PDA and the Server when uploading trips is reduced. Lastly, no further processing is required at the central server to eliminate redundant or useless data.

In order to store data locally on the PDA, a Microsoft® SQL CE database is utilized. Visual Basic .NET provides an SQLCE Database Connection and data manipulation objects to access the SQL CE database, allowing normal SQL "SELECT", "INSERT", and "UPDATE" queries as well as many other SQL commands. Since the .NET Compact Framework and its components are designed for the reduced capacity of handheld devices, SQLCE does not provide the complete functionality of a SQL Server 2000 database. However, the available functions are adequate for the scope of this system.

In one embodiment, the database consists of multiple tables that are interrelated to give each user their own profile. Every user has their own set of frequently visited locations, frequently used vehicles and frequently used presets, which contain source and destination locations as well as the mode of transportation used to travel. The schema of the database allows multiple users to be assigned to the same PDA but allows each user to view only their own travel information. Additionally, in order to be able to compare users that live in the same house, information regarding the user's household and status in the household (driver, dependent, etc.) is stored and can be retrieved at any time. This design allows sophisticated cross-references to be performed so that researchers can analyze travel data in relation to other individuals in the same household. Once the PDA and GPS record the coordinates and other information for a trip, it can be uploaded to the central database. Located within the TRAC-IT software on the main menu is a "Sync" option. This process synchronizes all data on the PDA with the data that is stored on the central SQL 2000 Server. Any fields that have been created or updated locally are updated at the server upon "Sync" through a process called Remove Data Access, or RDA. Because limited data storage is an issue on handheld devices, after all data relating to individual trips transferred to the central server, the data is deleted on the local PDA. However, users can view this data at any time by selecting the option "View Trips Archived on Server" from the main menu. Users have the freedom to "Sync" with the server whenever an Internet connection is available to them. Researchers can examine submitted data at any time by viewing the contents of the Server database through an Active Server Pages (ASP) web site. An exemplary design for such a relational database is shown with reference to FIG. 8. The data can then be exported to a local Microsoft® Excel tile where it can be analyzed or imported into another program.

In an additional embodiment, modem technology can be used to create a portable system consisting of a PDA, GPS, and wireless communication card that can automate the process of collecting travel behavior data. This system combines the accuracy, quantity, and automation of data collection provided by a GPS-device with the multi-modal analysis of paper and phone surveys. This system can record travel behavior "per user" instead of "per vehicle" across any mode of transportation, thereby creating a true household survey. Additionally, real-time communication allows the submission of data from remote locations as well as the capability to receive instant feedback or other information from various real-time sources of data. This system seeks to increase both the quality and quantity of collected data so that extended survey times could last weeks instead of one or two days. Additionally, all collected data is already in a relational database format which will allow sophisticated analysis of household travel behavior without any need for further processing or collection of data.

While the intricate selection process of the necessary hardware and software is rather difficult, the criteria of hardware device selection can be summarized in the following: For PDAs, the examined characteristics include processing power, operating system (OS) & availability of Software Development Kits (SDKs), device memory, battery power, expansion capabilities and cost. For GPS devices, the important characteristics are system integration, expansion capabilities, a high degree of accuracy and cost. The wireless communication device must be compatible with both the PDA and GPS components, and must attach to the other devices to form one physical device. Custom software was designed and developed that consists of program modules that implement a GUI to obtain information from the individual traveler, modules that receive and analyze GPS data, a local database and database management system, and a program module to transfer the database information to a central database.

The system and method in accordance with the present invention is a useful, novel and non-obvious enhancement of the travel behavior data collection process. Initial field tests show that the GUI collects a significant amount of information without being overly intrusive. Potential problems could arise if the individual does not make an effort to recharge the device before the next day, but vehicle chargers as well as standard plug chargers should give the user significant opportunities to recharge the device if necessary. While the system is fairly small, if a user complains about the size of the combined devices the communication card can be removed or inserted as needed without detriment to the system. While the lack of a GPS signal in a tunnel or parking garage could cause gaps in some trip records, the majority of travel behavior should be accurately reproduced.

Several other technologies may complement the system of the present invention to create additional uses and capabilities for the system. "GPS-enabled" cell phones, the new generations of smart phones, would seem to be a better alternative to the PDA/GPS/wireless card combination described in this paper. Due to the size and personal nature of the cell phone, a user would be more likely to carry it with them at all times resulting in a more accurate record of their daily travel habits. Secondly, Geographic Information Systems (GIS) resources would allow the user to consult many sources of real-time information. Data could be collected from these sources to provide the user with information related to traffic conditions, nearby restaurants and gas stations, or driving directions.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A computer system adapted to collect real-time multimodal travel behavior data from a user, the system comprising:
   a processor;
   a user interface coupled to the processor;
   a global positioning system receiver coupled to the processor; and
   a tangible memory storage coupled to the processor, the tangible memory storage including software instructions that cause the computer system, upon initiation of a user trip at a starting location, to perform:
      prompting the user, through the user interface, to indicate an expected trip purpose for the trip;
      acquiring global positioning system coordinates from the global positioning system receiver for the starting location of the user;
      identifying a starting location description from a database of location descriptions based upon the global positioning system coordinates of the starting location of the user, and if the database of location descriptions does not include a starting location description based upon the global positioning system coordinates of the starting location of the user, prompting the user to provide the starting location description through the user interface;
      acquiring global positioning system coordinates of the user from the global positioning system receiver at predetermined intervals during a duration of the user trip;
      prompting the user, through the user interface, to indicate that the user trip has ended or that the user is making a stop;

if the user indicates that the user is making a stop, prompting the user, through the user interface, to select their current location;
   acquiring global positioning system coordinates of the user from the global positioning system receiver for a stopping location of the user trip upon receiving the indication that the user is making a stop;
   determining a stopping location description from the database of location descriptions based upon the global positioning system coordinates of the stopping location, and if the database of location descriptions does not include a stopping location description based upon the global positioning system coordinates of the stopping location, prompting the user to provide the stopping location description through the user interface;
   displaying, through the user interface, the expected trip purpose and prompting the user to adjust the expected trip purpose to indicate a trip purpose associated with the stopping location description;
   determining a mode of transportation of the user between the starting location and the stopping location based upon the acquired global positioning system coordinates of the starting location and the global positioning system coordinates of the stopping location; and
   storing a first trip link data, wherein the first trip link data comprises the global positioning system coordinates of the starting location, the starting location description, the global positioning system coordinates of the stopping location, the global positioning system coordinates acquired prior to the stopping location, the stopping location description, the trip purpose associated with the stopping location description and the mode of transportation used between the starting location and the stopping location;
if the user indicates that the user trip has ended, prompting the user, through the user interface, to select their current location;
   acquiring global positioning system coordinates of the user from the global positioning system receiver for an ending location of the user trip upon receiving the indication that the user trip has ended;
   determining an ending location description from the database of location descriptions based upon the global positioning system coordinates of the ending location, and if the database of location descriptions does not include an ending location description based upon the global positioning system coordinates of the ending location, prompting the user to provide the ending location description through the user interface;
   displaying, through the user interface, the expected trip purpose and prompting the user to adjust the expected trip purpose to indicate a trip purpose associated with the ending location description;
   determining a mode of transportation of the user between the stopping location and the ending location based upon the acquired global positioning system coordinates for the stopping location and the global positioning system coordinates for the ending location;
   storing a second trip link data, wherein the second trip link data comprises the global positioning system coordinates of the stopping location, the stopping location description, the global positioning system coordinates of the ending location, the global positioning system coordinates acquired between the stopping location and the ending location, the ending location description, the trip purpose associated with the ending location description and the mode of transportation used between the stopping location and the ending location;
analyzing the first link trip data including the trip purpose associated with the stopping location description and the mode of transportation used between the starting location and the stopping location;
analyzing the second link trip data including the trip purpose associated with the ending location and the mode of transportation used between the stopping location and the ending location; and
providing recommendations to the user for changing the user trip or the mode of transportation of the user between the starting location and the stopping location or between the stopping location and the ending location based upon the analysis of the first link trip data and the second link trip data.

2. The computer system of claim 1, wherein the tangible memory storage further includes software instructions that cause the computer system to perform:
   determining the starting location description from a database of historical locations of the user if the global positioning system coordinates of the starting location are not available.

3. The computer system of claim 1, wherein the tangible memory storage further includes software instructions that cause the computer system to perform:
   determining the ending location description from a database of historical locations of the user if the global positioning system coordinates of the ending location are not available.

4. The computer system of claim 1, wherein the tangible memory storage further includes software instructions that cause the computer system to perform:
   determining the mode of transportation from the user if the global positioning system coordinates of the user between the starting location and the stopping location or the global positioning system coordinates of the user between the stopping location and the ending location are not available.

5. The computer system of claim 1, wherein the tangible memory storage further includes software instructions that cause the computer system to perform:
   receiving a previous mode of transportation for the trip if the mode of transportation of the user changes; and
   storing the previous mode of transportation with the first link trip data or the second link trip data.

6. The computer system of claim 1, wherein the tangible memory storage further includes software instructions that cause the computer system to perform:
   acquiring a starting time associated with the starting location from the global positioning system receiver;
   acquiring a stopping time associated with the stopping location from the global positioning system receiver;

acquiring an ending time associated with the ending location from the global positioning system receiver;
storing the starting time and the stopping time with the first link trip data; and
storing the stopping time and the ending time with the second link trip data.

7. The computer system of claim 1, wherein the tangible memory storage further includes software instructions that cause the computer system to perform:
acquiring a starting time associated with the starting location from the global positioning system receiver;
acquiring a stopping time associated with the stopping location from the global positioning system receiver;
acquiring an ending time associated with the ending location from the global positioning system receiver;
calculating a first speed of the first link of the trip based on the starting location, the starting time, the stopping location and the stopping time;
calculating a second speed of the second link of the trip based on the stopping location, the stopping time, the ending location and the ending time;
storing the first speed of the first link of the trip with the first link trip data; and
storing the second speed of the second link of the trip with the second link trip data.

8. The computer system of claim 1, further comprising a wireless connectivity module for transmitting the first link trip data and the second link trip data to a central database using the wireless connectivity module.

9. The computer system of claim 1, wherein the computer system is a hand-held computer system.

10. A mobile, hand-held device for collecting real-time multi-modal travel behavior data from a user, the mobile, hand-held device comprising:
a wireless connectivity module;
a global positioning system receiver;
a user interface;
a processor communicatively coupled to the wireless connectivity module, the global positioning system receiver and the user interface; and
a tangible memory storage coupled to the processor, the tangible memory storage including software instructions that cause the mobile, hand-held device, upon initiation of a user trip at a starting location, to perform:
prompting the user, through the user interface, to indicate an expected trip purpose for the user trip;
acquiring global positioning system coordinates from the global positioning receiver for the starting location of the user,
identifying a starting location description from a database of location descriptions based upon the global positioning system coordinates of the starting location of the user, and if the database of location descriptions does not include a starting location description based upon the global positioning system coordinates of the starting location of the user, prompting the user to provide the starting location description through the user interface;
acquiring global positioning system coordinates of the user from the global positioning system receiver at predetermined intervals during a duration of the user trip;
receiving an indication from the user through the user interface of an intermediate stop in the user trip after the trip has been initiated;
acquiring global positioning system coordinates of the user from the global positioning system receiver for the intermediate stop location upon receiving the indication of an intermediate stop in the user trip;
identifying an intermediate stop location description from a database of location descriptions based upon the global positioning system coordinates of the intermediate stop location, and if the database of location descriptions does not include an intermediate stop location description based upon the global positioning system coordinates of the intermediate stop location, the system prompts the user to provide the intermediate stop location description through the user interface;
displaying, through the user interface, the expected trip purpose and prompting the user to adjust the expected trip purpose to indicate an intermediate stop purpose associated with the intermediate stop location description;
determining a mode of transportation for the user trip based upon the acquired global positioning system coordinates for the user trip;
storing a first trip data, wherein the first trip data comprises the global positioning system coordinates of the starting location, the starting location description, the global positioning system coordinates acquired during the trip, the global positioning system coordinates of the intermediate stop location, the intermediate stop location description, the intermediate stop purpose and the mode of transportation between the starting location and the intermediate stop location;
receiving an indication from the user through the user interface that the user trip has ended;
acquiring global positioning system coordinates of the user from the global positioning system receiver for an ending location of the user trip upon receiving the indication that the user trip has ended;
determining an ending location description from the database of location descriptions based upon the global positioning system coordinates of the ending location, and if the database of location descriptions does not include an ending location description based upon the global positioning system coordinates of the ending location, prompting the user to provide the ending location description through the user interface;
displaying, through the user interface, the expected trip purpose and prompting the user to adjust the expected trip purpose to indicate a trip purpose associated with the ending location description;
storing a second trip data, wherein the second trip data comprises the global positioning system coordinates of the intermediate stop location, the intermediate stop location description, the global positioning system coordinates of the ending location, the ending location description, and the trip purpose associated with the ending location description and the mode of transportation used between the intermediate stop location and the ending location;
analyzing the first trip data including the intermediate stop purpose and the mode of transportation used between the starting location and the intermediate stop location;
analyzing the second trip data including the trip purpose associated with the ending location description and the mode of transportation used between the intermediate stop location and the ending location; and providing recommendations to the user for changing the user trip or the mode of transportation of the user between the starting location and the intermediate stop location or between the intermediate stop location and the ending location based upon the analysis of the first trip data and the second trip data.

11. The hand-held device of claim 10, wherein the tangible memory storage further includes software instructions that cause the mobile, hand-held device to perform;
    verifying the starting location description through the user interface.

12. The hand-held device of claim 10, wherein the tangible memory storage further includes software instructions that cause the mobile, hand-held device to perform:
    verifying the intermediate stop location description through the user interface.

13. The hand-held device of claim 10, wherein the tangible memory storage further includes software instructions that cause the mobile, hand-held device to perform:
    verifying the ending location description through the user interface.

14. The hand-held device of claim 10, wherein the tangible memory storage further includes software instructions that cause the mobile, hand-held device to perform:
    determining the starting location description from a database of historical locations of the user if the global positioning system coordinates of the starting location are not available.

15. The hand-held device of claim 10, wherein the tangible memory storage further includes software instructions that cause the mobile, hand-held device to perform:
    determining the intermediate stop location description from a database of historical locations of the user if the global positioning system coordinates of the intermediate stop location are not available.

16. The hand-held device of claim 10, wherein the tangible memory storage further includes software instructions that cause the mobile, hand-held device to perform:
    determining the ending location description from a database of historical locations of the user if the global positioning system coordinates of the ending location are not available.

17. The hand-held device of claim 10, wherein the tangible memory storage further includes software instructions that cause the mobile, hand-held device to perform:
    determining the mode of transportation from the user if the global positioning system coordinates of the user during the trip are not available.

18. The hand-held device of claim 10, wherein the tangible memory storage further includes software instructions that cause the mobile, hand-held device to perform:
    acquiring an intermediate stop time from the global positioning system receiver when the system receives the indication of the intermediate stop; and
    storing the intermediate stop time with the first trip data and the second trip data.

19. The hand-held device of claim 10, wherein the tangible memory storage further includes software instructions that cause the computer system to perform:
    acquiring an intermediate stop time from the global positioning system receiver when the system receives the indication of the intermediate stop;
    calculating a first trip speed based on the starting location, the starting time, the intermediate location and the intermediate stop time; and
    storing the first trip speed with the first trip data.

20. The hand-held device of claim 10, wherein the tangible memory storage further includes software instructions that cause the mobile, hand-held device to perform:
    acquiring an intermediate stop time from the global positioning system receiver when the system receives the indication of the intermediate stop;
    calculating a second trip speed based on the intermediate location, the intermediate stop time, the ending location and the ending time; and
    storing the second trip speed with the second trip data.

* * * * *